Sept. 12, 1961 T. E. PETERSEN 2,999,519
MULTI-PURPOSE POWER TOOL
Filed June 22, 1959 2 Sheets-Sheet 1

TONY E. PETERSEN
INVENTOR.

BY James A. Girnan
ATT'Y

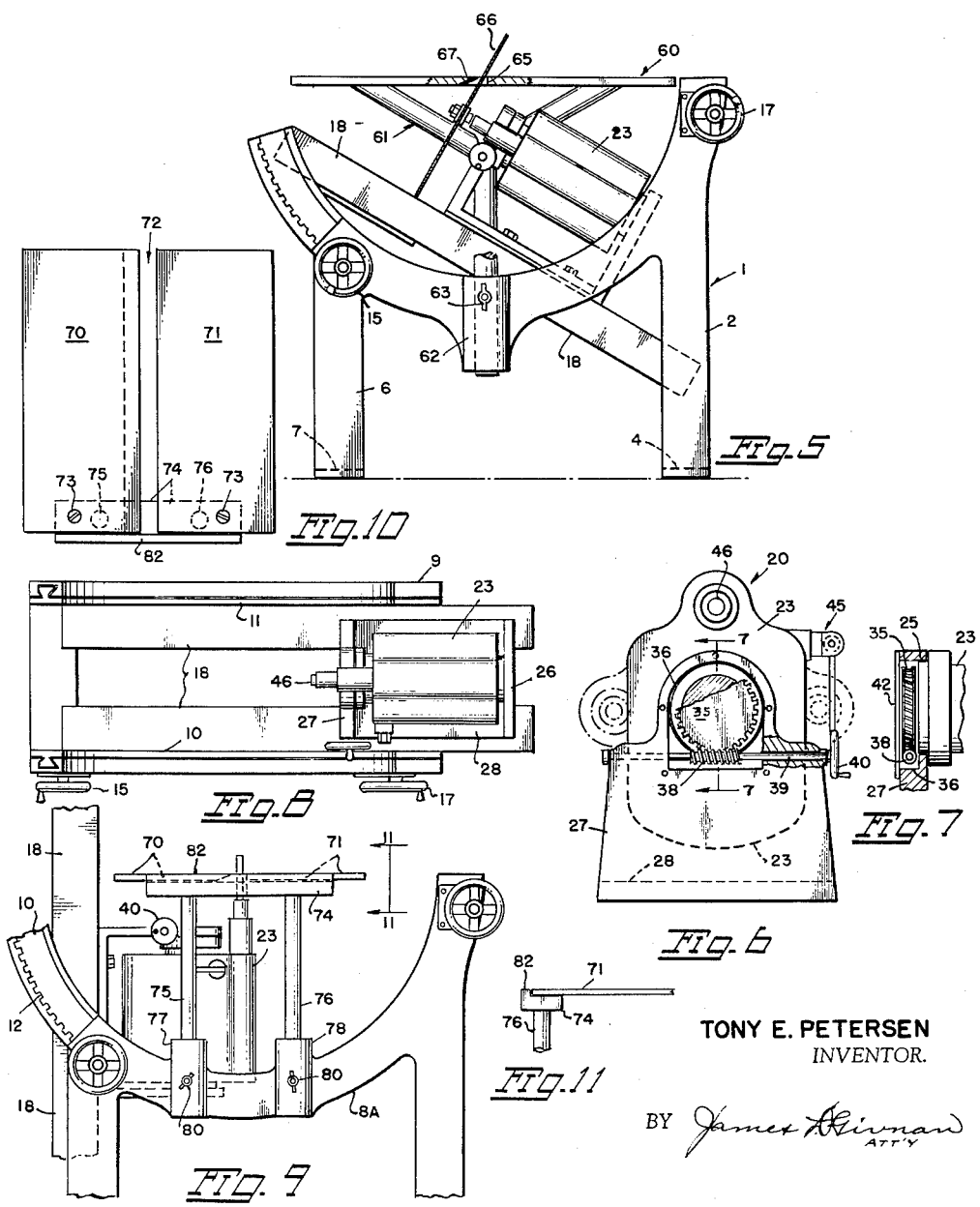

United States Patent Office

2,999,519
Patented Sept. 12, 1961

2,999,519
MULTI-PURPOSE POWER TOOL
Tony E. Petersen, 8833 SE. Pine, Portland 16, Oreg.
Filed June 22, 1959, Ser. No. 821,806
5 Claims. (Cl. 144—1)

This invention relates generally to metal working and woodworking machines and more particularly to a multi-purpose power tool which is designed for easy adjustment or conversion to adapt it for use as a metal or wood turning lathe, a drill press, table saw, spindle shaper, disk sander and other spindle driven machine tool operations.

One of the principal objects of the invention is the provision of a power tool of this character which is of simple, efficient, durable and relatively inexpensive construction comprising a minimum number of parts, including a base having segmental guide tracks, segmental slide members slidably mounted within the guide tracks and both on a radius of curvature from a common center, a head-stock and tail-stock slidably and lockably mounted on ways which interconnect the slide members and are movable therewith from a horizontal position for use as a lathe, or other horizontal spindle operations, through 180 degrees of a circle into a position where the head-stock can function as a drill press or the ways can be locked in any angular position relative to a table, which is removably secured to the base but when in use is securely held in a horizontal position on a plane passing through the common center of the segmental guide and track members.

Another object of the invention is the provision of a spindle driving head-stock wherein the spindle is rotatable about the longitudinal axis of the head-stock to vary the space between the spindle and the axis of the ways. This feature in conjunction with head-stock movement lengthwise of the ways and the circular movement of the ways about the center of the segmental members enables placement of cutting tools in various planes intersecting that center and the proper positioning of a table saw, disk sander, or the like, relative to the table. Since this common center remains constant, a point on a plane passing through that center will show a decrease in linear movement until it reaches the center.

The foregoing and other objects and advantages which will become subsequently apparent reside in the details of construction and operation as more fully hereinafter described and claimed, reference being had to the accompanying drawings forming a part hereof and in which:

FIGURE 5 is a view similar to FIGURE 1 showing the tool in position for use as a table saw.

FIGURE 6 is an elevational view on an enlarged scale of the left-hand end of the head-stock as shown in FIGURE 1.

FIGURE 7 is a sectional detail view taken approximately along the line 7—7 of FIGURE 6.

FIGURE 8 is a top plan view of FIGURE 1 with the tail-stock removed.

FIGURE 9 is a view similar to FIGURE 5 showing the tool in position for use as a spindle shaper and provided with a modified form of table.

FIGURE 10 is a top plan view of the table and supporting means therefor as shown in FIGURE 9.

FIGURE 11 is a fragmentary elevational detail view taken approximately along the line 11—11 of FIGURE 9.

Figure 1:
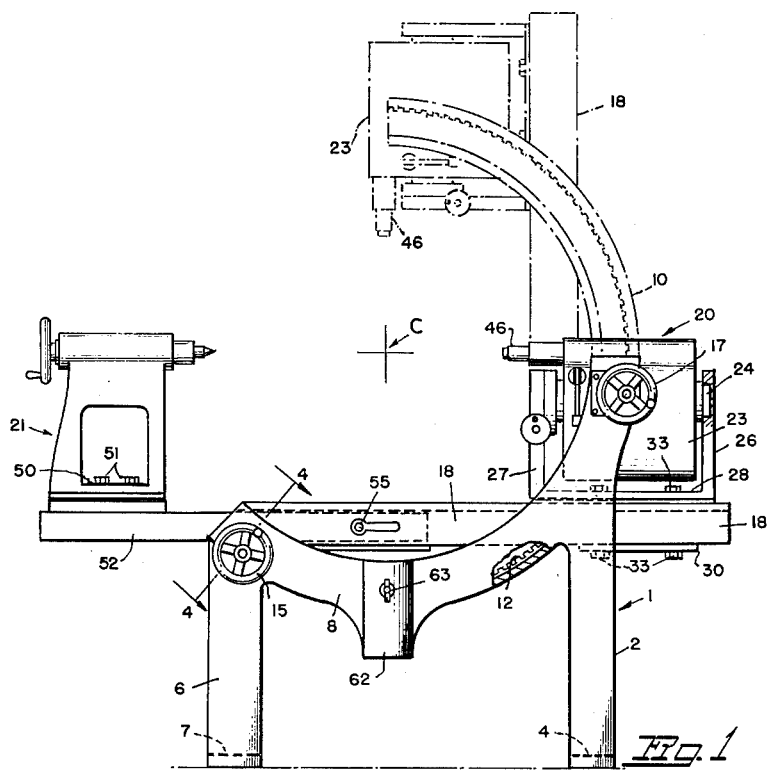
FIGURE 1 is a side elevational view of a multipurpose tool made in accordance with my invention and shown in position for use as a lathe.
Figures 2, 3, 4:
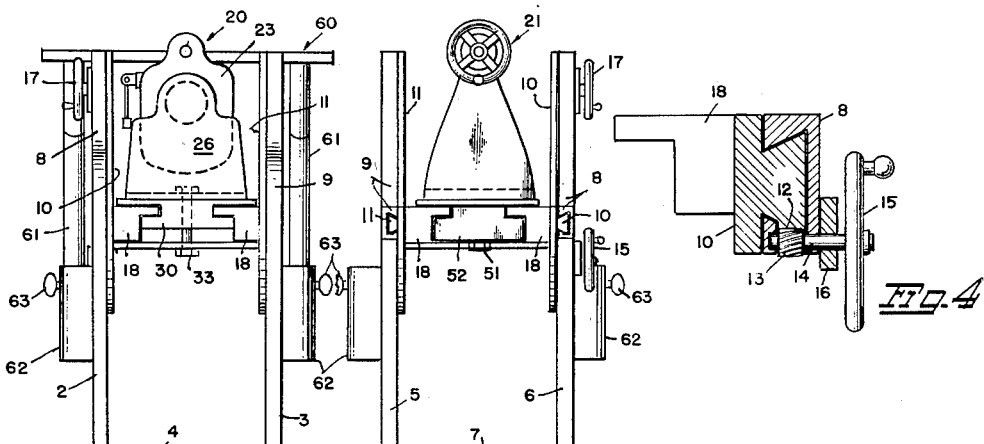
FIGURE 2 is an elevational view of the right-hand end of FIGURE 1 with the tail-stock removed and showing a table supported in an operative position relative to the head-stock.
FIGURE 3 is an elevational view of the opposite end of FIGURE 1 with the head-stock removed.
FIGURE 4 is a sectional end view on an enlarged scale taken approximately along the line 4—4 of FIGURE 1.

With continuing reference to the drawings, wherein like reference characters designate like parts, and particularly FIGURES 1 to 4, there is illustrated a combination multi-purpose or convertible tool which embodies the principal features of the invention and which is arranged with the elements or parts thereof in the position in which the tool forms a wood or metal working lathe. The illustrated device comprises a base in the form of a supporting frame indicated generally by reference numeral 1 and comprising a first pair of leg members 2 and 3 interconnected at their bottom ends by a cross member 4, and a second pair of leg members 5 and 6 interconnected at their bottom ends by a cross member 7. The top ends of both pairs of leg members are cast integral with parallel segmental guide track members 8 and 9 shaped in cross section as shown in FIGURE 4 to slidably support slidable segmental members 10 and 11. The fixed segmental track members and the slidable segmental members are formed on a radius of curvature from a common center indicated at C. The slidable segmental member 10 is provided with a gear rack 12 along its outer edge meshing with a first spiral gear 13 (FIGURE 4) secured to one end of a shaft 14 provided with a hand wheel 15 at its outer end and journalled in a plate 16 secured to one end of the fixed segmental member 8. The opposite end of this segmental member 8 is similarly provided with a hand wheel 17 driving a second spiral gear (not shown) enmeshed with the gear rack 12 of the slidable segment 10. Rotation of the hand wheels 15 and 17 in one direction will move the segments 10 and 11 into the broken line position shown (FIGURE 1), and reverse rotation of the hand wheels will, of course return the segments 10 and 11 to their original position and the gears are capable of locking the segments 10 and 11 in any adjusted position relative to the fixed segments 8 and 9. Secured to the slidable segments 10 and 11 are parallel ways 18 for a head-stock indicated generally at 20, a tail-stock indicated generally at 21 and for a cross slide for a tool rest (not shown).

The head-stock comprises a motor (not shown) disposed within a housing 23 swingably mounted as at 24 (FIGURE 1) and 25 (FIGURES 6 and 7) in the upper ends of supporting brackets 26 and 27, respectively, interconnected by a base portion 28. By means of this base portion and through the medium of a plate 30 (FIGURES 1 and 2) the head-stock 20 is slidable lengthwise of the ways 18 and lockable thereto by means of locking bolts 33. The ways 18 are permanently secured to and movable with the slidable segments 10 and 11 as will be more fully hereinafter pointed out.

The bearing end 25 of the head-stock motor housing 23 (FIGURE 7) is provided with a worm gear 35 disposed within a recess 36 in the upper end of the bracket 27 and enmeshed at all times with a worm 38 secured to a shaft 39 journalled in the bracket 27 and provided with a hand wheel 40 at one of its ends as shown. The recess is provided with a closure plate 42 for retention of a suitable lubricant. From the foregoing it will be apparent, as shown in FIGURE 6, that by rotating the worm 38 in one direction and then in an opposite direction the head-stock can be swung from the vertical position, shown in full lines, to either side thereof into the broken and dotted line positions indicated. The head-stock is provided with the conventional locking mechanism 45 for locking it in any of the positions just described or any intermediate position. The motor (not shown) within the housing 23 is geared in the conventional manner to a tool chuck 46 and is in electrical circuit through a switch (not shown) with a source of electrical energy, also in the conventional manner.

The tail-stock 21 (FIGURE 1) is provided with a base 50 secured by means of bolts 51 to a plate 52 (FIGURE 3) slidable within the ways 18 and the plate is lockable in adjusted positions relative to the ways by means of a lever-actuated bolt 55 threaded through one of the rails of the ways, as shown in FIGURE 1.

When the parts of the machine are adjusted into the position shown in FIGURE 5 for use as a table saw, for example, I provide a table top 60 secured to the top of Y brackets 61 mounted within vertical sleeves 62 integrated with the fixed segmental members 8 and 9. The brackets are locked within the sleeves by means of thumb screws 63 and the top surface of the table is in a horizontal plane passing through the common center of the segmental members 8–11. The table top is provided with a transverse slot 65 to accommodate a circular saw 66 for vertical cuts and cut away or beveled as at 67 to accommodate the saw when positioned for angular cuts through a workpiece supported upon the horizontal table top. This facilitates the sawing operation and renders it more accurate since the beveled cut can be made while the table remains level.

The modified form of table shown in FIGURES 9–11 comprises a pair of parallel plates 70 and 71 arranged with a space 72 between them and secured at one of their ends as at 73 to a supporting bracket 74 mounted upon the top end of two supporting legs 75 and 76 locked by thumb screws 80 within sleeves 77 and 78 integrated with or secured to the segmental guide member 8A of the supporting frame 1A. A top surface of the table plates is in a horizontal plane passing through the common center C of the segmental members 8–11.

For automatically arranging and maintaining the table plates 70 and 71 in parallel spaced relationship, as aforesaid, I provide the supporting bracket 74 with a ridge 82 along its outside edge. The corresponding ends of the table plates are held in abutment with the inside wall of the ridge by the fastening elements 73.

From the foregoing it is apparent that I have provided a multipurpose tool which in any one of its several uses is favorably comparable to the better-type equivalent light-duty, single purpose tool in capacity and function. Yet, it is not adversely dominated by the primary characteristics of any one single purpose tool.

Assuming that the fixed segmental guide tracks 8 and 9 and the slidable segmental members 10 and 11 are formed on a radius of eighteen inches from their common center C, such a radius would result in a maximum spindle-to-way distance of about twelve inches. A further advantage as a drill press would be a tiltable spindle, operable from zero to 90 degrees of a circle while the table 60 or 70—71 remains level maintaining the same spindle-to-ways (now column) distance of twelve inches. These are features not found in light-duty drill presses known in the art.

Another advantage is that when set up as a table saw, it is the tilting arbor type. This is particularly desirable for ease and accuracy of operation, since a beveled cut can be made while the table remains level.

A further advantage is its capability as a lathe, by removing the table, and installing a cross slide, the tailstock 21, a tool rest and if desired the way extension 52. Maintaining the eighteen inch radius, the lathe would have a twelve inch spindle-to-way distance and it would accommodate workpieces of thirty to thirty-six inches in length.

A still further advantage is its capability as a spindle shaper, also tilting arbor. Longitudinal movement of the head-stock 20 on the ways 18 allows raising or lowering the cutter in relation to the table. Tilting the cutter permits of a wider range of contours with any given cutter.

A still further advantage is that by arranging the parts in a table saw position and removing the saw blade, a jig saw or a band saw can be accommodated on the ways, to be driven by the head-stock. Such a band saw or jig saw would be tilting blade in relation to the table, and for either of these uses the table 70—71 shown in FIGURE 9 would be used. The one motor contained within the head-stock 20 is usable in all operations of the machine.

While I have shown a particular form of embodiment of my invention, I am aware that many minor changes therein will readily suggest themselves to others skilled in the art without departing from the spirit and scope of the invention. Having thus described my invention what I claim as new and desire to protect by Letters Patent is:

1. A multipurpose power tool comprising in combination a stationary main base including a pair of spaced apart parallel segmental guide tracks, segmental slide members slidably mounted in said guide tracks, said slide members and guide tracks formed on equal radii of curvature having common centers spaced apart a distance equal to the spacing of said tracks, parallel ways permanently secured to said slide members with the longitudinal axis of the ways parallel to the planes of said slide members, a power-driven spindle, means mounting said spindle for sliding movement in a straight path along the ways parallel thereto, means for locking the spindle to the ways, the axis of said spindle extending in a direction at right angles to and intersecting a line joining said spaced apart centers throughout all movements of said slide members relative to said guide tracks and throughout all movement of the spindle along said ways.

2. A multipurpose power tool comprising in combination a stationary main base including a pair of spaced apart parallel segmental guide tracks, segmental slide members slidably mounted in said guide tracks, said slide members and guide tracks formed on equal radii of curvature having common centers spaced apart a distance equal to the spacing of said tracks, parallel ways permanently secured to said slide members with the longitudinal axis of the ways parallel to the planes of said slide members, a bracket, means mounting said bracket for sliding movement along said ways in a straight path, means locking said bracket to the ways, a spindle-driving headstock mounted on the bracket, a spindle carried and driven by said headstock, the axis of the spindle at all times being in parallel relationship with said ways and extending in a direction at right angles to and intersecting a line joining said spaced apart centers throughout all movement of said slide members relative to said guide tracks and throughout all movement of said bracket along the ways.

3. A multipurpose power tool comprising in combination a stationary main base including a pair of spaced apart parallel segmental guide tracks, segmental slide members slidably mounted in said guide tracks, said slide members and guide tracks formed on equal radii of curvature having common centers spaced apart a distance equal to the spacing of said tracks, parallel ways permanently secured to said slide members with the longitudinal axis of the ways parallel to the planes of said slide members and thereby movable through 180 degrees of a circle from a horizontal position to a vertical position, a headstock and a tailstock, means mounting the headstock and tailstock for independent adjustable and lockable positioning lengthwise of the ways in a straight path parallel thereto, the axes of said headstock and said tailstock extending in a direction at right angles to and intersecting a line joining said spaced apart centers throughout all movement of said slide members relative to said guide tracks and throughout all movement of the headstock and tailstock along said ways, means locking said slide members and parallel ways in any position within said 180 degrees of a circle whereby the tool may be used selectively as a spindle shaper, lathe or drill press.

4. A multipurpose power tool comprising in combination a stationary main base including a pair of spaced apart parallel segmental guide tracks, segmental slide members slidably mounted in said guide tracks, said slide members and guide tracks formed on equal radii of curvature having common centers spaced apart a distance equal to the spacing of said tracks, parallel ways permanently secured to said slide members with the longitudinal axis of the ways parallel to the planes of said slide members and thereby movable within 180 degrees of a circle from a horizontal position, a power-driven spindle, means mounting said spindle for adjustable and lockable positioning lengthwise of the ways in a straight path parallel thereto, the axis of the spindle extending in a direction at right angles to and intersecting a line joining said spaced apart centers throughout all movement of said slide members relative to said guide tracks and throughout all movements of the spindle along said ways, means locking said slide members and parallel ways in any position within said 180 degrees of a circle, a table top having a slot therethrough, means mounting the table top for adjustable and lockable positioning vertically relative to said ways, a circular saw secured to said spindle and extending through said slot whereby the tool may be used as a tilting arbor saw.

5. A multipurpose power tool comprising in combination a stationary main base including a pair of spaced apart parallel segmental guide tracks, segmental slide members slidably mounted in said guide tracks, said slide members and guide tracks formed on equal radii of curvature having common centers spaced apart a distance equal to the spacing of said tracks, parallel ways permanently secured to said slide members with the longitudinal axis of the ways parallel to the planes of said slide members and thereby movable through 180 degrees of a circle from a horizontal position to a vertical position, a headstock, means mounting the headstock for adjustable and lockable positioning lengthwise of the ways in a straight path parallel thereto and for swinging the headstock to positions on either side of the axis of said bracket, means for locking the headstock in any of said positions whereby headstock-to-ways distance may be varied, the axis of said headstock extending in a direction at right angles to a line joining said spaced apart centers throughout all movement of said slide members relative to said guide tracks and throughout all movement of the headstock along said ways, means locking said slide members and parallel ways in any position within said 180 degrees of a circle.

References Cited in the file of this patent

UNITED STATES PATENTS

| | | |
|---|---|---|
| 1,167,091 | McGill | Jan. 4, 1916 |
| 1,510,167 | Wilhelm | Sept. 30, 1924 |
| 1,991,285 | Linder | Feb. 12, 1935 |
| 2,623,269 | Goldschmidt | Dec. 30, 1952 |

FOREIGN PATENTS

| | | |
|---|---|---|
| 689,368 | France | May 26, 1930 |
| 941,223 | France | July 5, 1948 |
| 277,394 | Switzerland | Dec. 1, 1951 |